Nov. 5, 1963  F. G. VON SAURMA  3,109,311
VACUUM-TUBE ACCELEROMETER
Filed June 24, 1960  3 Sheets-Sheet 1

Friedrich G. von Saurma,
INVENTOR.

BY S. J. Rotondi,
A. T. Dupont,
and
Alvin E. Moore,
ATTORNEYS.

Nov. 5, 1963  F. G. VON SAURMA  3,109,311
VACUUM-TUBE ACCELEROMETER
Filed June 24, 1960  3 Sheets-Sheet 2

Friedrich G. von Saurma,
INVENTOR.
S. J. Rotondi,
BY A. T. Dupont
and
Alvin E. Moore,
ATTORNEYS.

Nov. 5, 1963     F. G. VON SAURMA     3,109,311
VACUUM-TUBE ACCELEROMETER
Filed June 24, 1960     3 Sheets-Sheet 3

Friedrich G. von Saurma,
*INVENTOR.*

BY S. J. Rotondi,
A. T. Dupont,
and
Alvin E. Moore,
ATTORNEYS.

United States Patent Office 3,109,311
Patented Nov. 5, 1963

3,109,311
VACUUM-TUBE ACCELEROMETER
Friedrich G. von Saurma, 3309 Panorama Drive,
Huntsville, Ala.
Filed June 24, 1960, Ser. No. 38,407
3 Claims. (Cl. 73—517)
(Granted under Title 35, U.S. Code (1952), sec. 266)

The invention described herein may be manufactured and used by or for the Government for governmental purposes without the payment of any royalty thereon.

This invention relates to an instrument for measuring accelerations or indicating departures of an element from a level or horizontal position.

The problem of design and construction of an efficient, accurate and low-cost accelerometer or level indicator is of increasing importance in the development of guided missiles and space vehicles. Some of the disadvantages of prior-art accelerometers are: (1) heavy weight causing the instrument to have considerable friction and be vulnerable to breakage under high accelerations (this high weight is due in part to the need of sufficient mass to respond to small accelerations, against the reaction force that is the result of sending a sufficiently strong electric signal for indicating the movement, against the drag of the ambient air if the instrument is used in the atmosphere, and against the friction of the instrument's bearings; the heavy weight is also due in part to the complexity and heaviness of such elements as gyroscopes and devices for compensating for friction); (2) if air bearings are used they frequently involve a severe limitation of the amount of acceleration the instrument will stand without a jamming of metal against metal in the bearings; and (3) the high cost and complexity of such a device, for example, as a gyroscopic accelerometer.

Some known accelerometers that are designed for use in measuring only one or two g's and are mainly used as level indicators also have a large weight and considerable complexity.

In view of these facts, an object of the present invention is to provide an acceleration-measuring and level-indicating instrument that has an accurate, quick-acting, acceleration-responsive element of small mass.

Another object of the invention is to provide an accelerometer having a low-mass, acceleration-responsive element and nearly frictionless bearings.

A further object is to provide an accelerometer that comprises an electrical amplifier having a part that functions as an acceleration-responsive element.

Still another object is to provide an accelerometer comprising a vacuum tube, having an acceleration-responsive element that is movable within the glass or metal wall of the tube.

The foregoing and other objects will become more fully apparent from the following detailed description of exemplary structure embodying the invention and from the accompanying drawings, in which.

Figure 1:
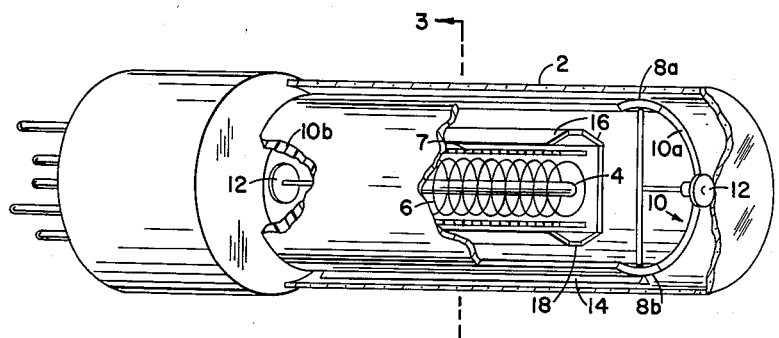
FIGURE 1 is a perspective view, partly in section, of one form of the invention.

The form of the invention shown in FIGURE 1 comprises a vacuum-tube envelope 2, which may be of glass or metal, a heated cathode 4, a negatively-charged control grid 6, a screen grid 7, and an anode comprising two plates 8a and 8b. These plates are part of a rotatable cylinder 10, and are joined together in the cylinder by parts 10a and 10b of insulating material, which preferably is a plastic. Cylinder 10 is rotatably supported in the vacuum of the tube by jewel bearings 12 that are fixed to the walls of the tube.

To lower plate 8b there is affixed a weight 14, which converts cylinder 10 into a quasi pendulum, swung from jewel bearings 12.

The cylinder surrounds beam-forming plates 16; and within these plates cathode 4 and grid 6 are located. An acceleration or deceleration of the tube's support causes weight 14 to lag relative to envelope 2, thus moving plates 8a and 8b from over the beams of electrons that flow outward from gaps 18 between the plates. This movement reduces the flow of electrons from the plates, thus sending an electric signal that the support of the tube has departed from its previous position.

Figure 2:
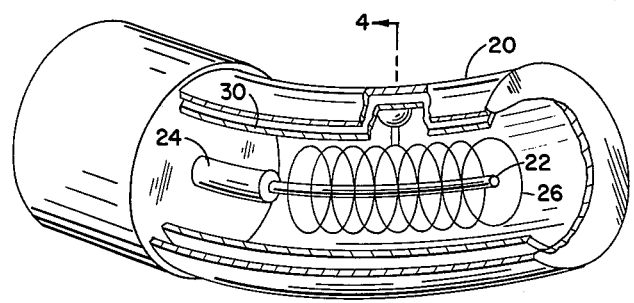
FIGURE 2 is a perspective view, partly in section, of a second form of the invention.
Figure 4:
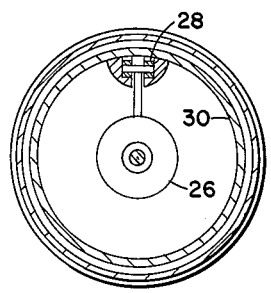
FIGURE 4 is a sectional view from the plane 4—4 of FIGURE 2.
Figure 3:
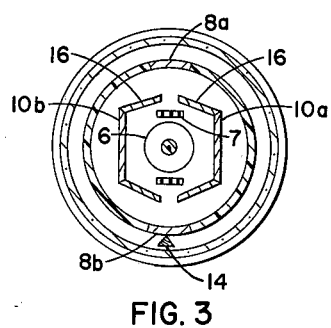
FIGURE 3 is a sectional view from the plane 3—3 of FIGURE 1.

A second form of the invention, shown in FIGURE 2, comprises a curved-tube envelope 20; a heated cathode 22 that is fixed to an end wall of the tube by support 24 of insulating material; a control grid 26 that is the weighted part of a pendulum, and is swung from jeweled bearings 28. In known manner, grid 26 is negatively charged and limits the flow of electrons from cathode 22 to annular anode 30. When in response to an acceleration the grid swings off of part of the cathode a larger flow of electrons results, with a corresponding electric signal from the plates.

Figure 5:
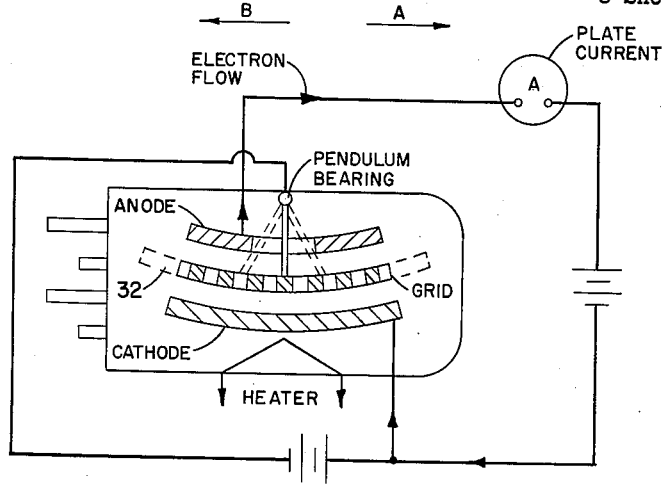
FIGURE 5 is a schematic view, illustrating a use of the invention in connection with a simple type of circuit and level indicator.

FIGURE 5 schematically shows use of this second form of the invention in a simple circuit for indication of an out-of-level movement or one-way acceleration of the tube's support. If a support on which the tube is mounted receives an acceleration indicated by arrow A (as by shifting into an out-of-level position), the negatively charged grid lags, with relative motion in the direction B, pivoting on its pendulum bearing, and thus relatively moves to the position indicated by dotted lines 32. This movement causes an increases flow of electrons, and an electric signal to be supplied to the ammeter, indicating that the tube is subjected to acceleration A.

Figure 6:
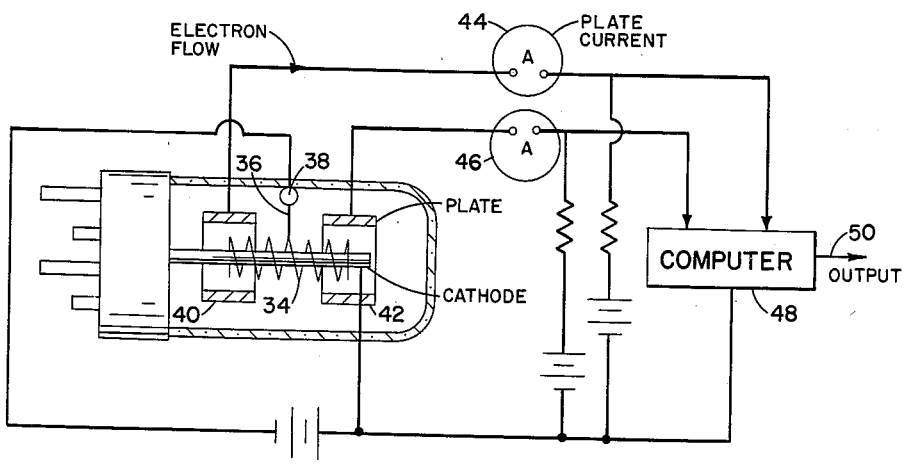
FIGURE 6 is a schematic view, illustrating a use of the invention with two signal-transmitting circuits that are connected to a computer.

FIGURE 6 semi-schematically illustrates a third form of the invention, in which negatively charged grid 34, with a pendulum arm 36, pivoted at 38, normally is centered between two separate cylindrical anodes or plates 40 and 42. If, in response to an acceleration, the grid for example swings to the right as shown in FIGURE 6, a greater flow of electrons from anode 40 occurs, and a smaller flow of electrons from anode 42. Accordingly, ammeter 44 will indicate an increased current, and thus broadly indicate that an acceleration or out-of-level position of the tube's support is occurring; and ammeter 46 will indicate a decreased current. Either of these ammeters may be calibrated to indicate, instantaneously, the acceleration which is causing the pendulous grid to shift, and/or the angle of shift of the tube's support relative to the horizontal that has occurred.

In lieu of or in addition to the indicators 44 and 46 a known type of computer, 48, may be utilized. In this computer the signals from anodes 40 and 42 may be integrated (compared with time) to produce a signal that indicates velocity, and optionally doubly integrated to produce a signal that indicates distance traversed by the tube's support. If this support, for example, is a ballistic missile the output signals from the computer may be transmitted via electrical conduit 50 to a telemetering device, for transmission to a receiver on the earth.

Figure 7:
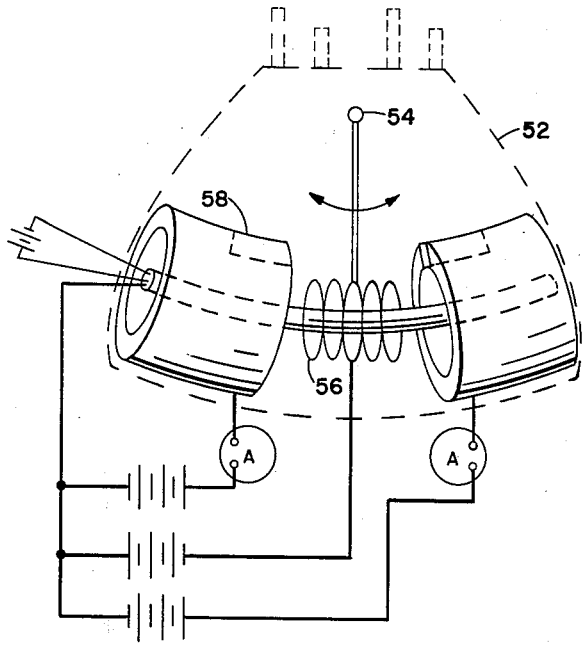
FIGURE 7 is a semi-schematic, elevational view, showing another form of the invention.

FIGURE 7 illustrates a variant of the form of the invention shown in FIGURE 5. In this form a pair of curved cylindrical anodes are fixed within a correspondingly curved tube that is schematically indicated by dotted lines 52. The center of curvature of the inner concave line of each of the two separate anodes is preferably on the pivotal axis 54 of the pendulum; and there is clearance between curved grid 56 and the anodes in all positions of the grid. The grid may swing into either of the anodes due to slots 58, each of which allows free passage of the pendulum arm until it reaches the middle of an anode.

Figure 8:
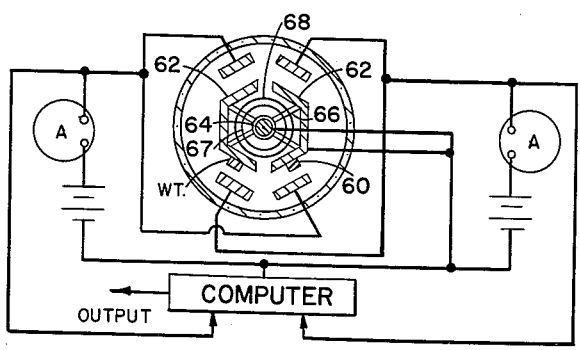
FIGURE 8 is a semi-schematic end view, partly in section, of a fifth form of the invention.

FIGURE 8 is a semi-schematic end view partly in section, showing a preferred form of the invention, in which weights 60 cause beam-forming plates 62 to serve as an acceleration-responsive pendulum. These plates are electrically connected and are supported on jeweled pivot bearings 64 by means of rods 66. Four of these rods are located at each end and outside of the cylindrical, electron-tube control grid 67 and cylindrical electron-tube screen 68.

Figure 9:
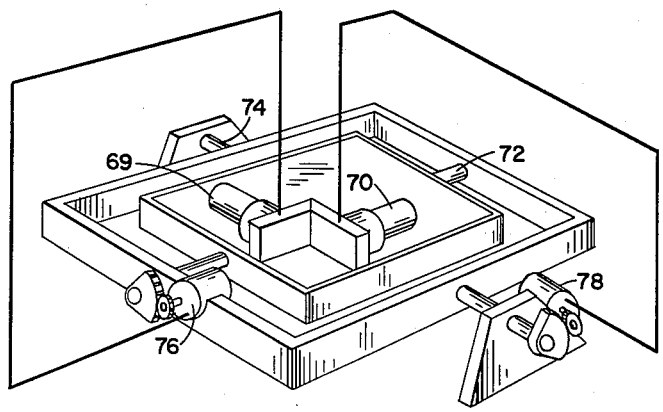
FIGURE 9 is a perspective view of an automatically-controlled horizontal platform that utilizes the present invention.

In FIGURE 9 a pivoted platform that is automatically controlled by means of this invention is illustrated. Two of the instruments, here used as level-indicating means, are shown on the platform at 69 and 70. Device 69 senses departures of the platform from the horizontal about the axis of pivot 72; and device 70 senses departures about the axis of pivot 74. Signals from the instruments, amplified, cause reversible motors 76 and 78 to turn in the proper directions to bring the platform back into a horizontal position.

The invention comprehends various changes in structure from that herein illustrated, within the scope of the subjoined claims.

The following invention is claimed:

1. A device of the character described, comprising: an hermetically-sealed, vacuum-containing tube; a cathode fixedly supported within said tube; an electron-tube control grid fixedly supported within said tube and surrounding said cathode; an electron-tube screen fixedly supported within said tube between said grid and said tube and surrounding said grid; two pairs of anodes, each pair being adjacent the inside of said tube and located diametrically opposite the other pair, the anodes of each pair being separated by a space; two pairs of integrally-connected beam-forming plates, partially surrounding said screen and located between said screen and said anodes and completely isolated within said hermetically-sealed tube, each of said pairs of plates having a gap between the two plates, thru which, when said tube is not subjected to acceleration or tilting, electron beams are adapted to be directed into said space and thru which, when said tube is subjected to acceleration and tilting, electron beams are directed to said anodes; jeweled bearings journaling said beam-forming plates for rotation around said cathode and relative to said space; weights attached to the lower pair of said beam-forming plates; and a pair of electric circuits, one circuit comprising one of said diametrically-arranged pair of anodes and an ammeter, and the other circuit comprising the other diametrically-arranged pair of anodes and an ammeter and a computer electrically connected to said circuits for receiving and integrating signals from said circuits.

2. A vacuum-tube accelerometer, comprising in combination: a hermetically sealed tube, an electron emitting cathode supported within said tube, a control grid mounted in said tube and surrounding said cathode, a pair of beam-forming plates for directing the flow of electrons from said cathode, said plates partially surrounding said control grid and forming first and second air gaps through which said electrons flow, a first anode mounted adjacent said first air gap and positioned between said beam-forming plates and said hermetically sealed tube, a second anode mounted adjacent said second air gap and positioned between said beam forming plates and said hermetically sealed tube, first and second insulating members secured to said anodes and forming a cylinder therewith, a pair of jeweled bearings secured to said tube, and support members attached to said cylinder and journalled in said bearings whereby an acceleration of said tube displaces said anodes with respect to said air gaps.

3. A vacuum-tube accelerometer as set forth in claim 2, further comprising a weight secured to one of said anodes.

References Cited in the file of this patent
UNITED STATES PATENTS

| | | |
|---|---|---|
| 1,613,948 | Hartley | Jan. 11, 1927 |
| 1,836,569 | Benjamin | Dec. 15, 1931 |
| 1,936,922 | Sukumlyn | Nov. 28, 1933 |
| 2,399,420 | Ziebolz | Apr. 30, 1946 |
| 2,406,982 | Zworykin et al. | Sept. 3, 1946 |
| 2,548,385 | Marshall | Apr. 10, 1951 |
| 2,797,912 | Trostler | July 2, 1957 |
| 2,839,701 | Bourns | June 17, 1958 |